(12) United States Patent
Lappos et al.

(10) Patent No.: US 7,651,050 B2
(45) Date of Patent: Jan. 26, 2010

(54) VARIABLE SPEED GEARBOX WITH AN INDEPENDENTLY VARIABLE SPEED TAIL ROTOR SYSTEM FOR A ROTARY WING AIRCRAFT

(75) Inventors: Nicholas D. Lappos, Stratford, CT (US); Edward Karedes, Cheshire, CT (US); Harsh Vinayak, Meriden, CT (US); Yuriy Gmirya, Woodbridge, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 0 days.

(21) Appl. No.: 12/203,358

(22) Filed: Sep. 3, 2008

(65) Prior Publication Data

US 2008/0315035 A1   Dec. 25, 2008

Related U.S. Application Data

(62) Division of application No. 11/292,556, filed on Dec. 2, 2005, now Pat. No. 7,434,764.

(51) Int. Cl.
*B64C 27/04* (2006.01)

(52) U.S. Cl. .............. 244/17.11; 244/17.19; 244/17.23; 244/60

(58) Field of Classification Search ............ 244/60, 244/17.19, 17.21, 17.23; 476/40, 42; 74/665 B, 74/665 C, 665 F
See application file for complete search history.

(56) References Cited

U.S. PATENT DOCUMENTS

| | | | |
|---|---|---|---|
| 1,154,769 A * | 9/1915 | Hertzberg | 475/280 |
| 1,431,683 A | 10/1922 | Ramsay | |
| 2,811,324 A | 10/1957 | Alex | |
| 2,936,970 A | 5/1960 | McCann | |
| 3,002,710 A | 10/1961 | Marchetti et al. | |
| 3,255,825 A * | 6/1966 | Mouille et al. | 416/170 R |
| 3,362,255 A | 1/1968 | De Rocca et al. | |
| 3,364,681 A | 1/1968 | Glover et al. | |
| 3,506,219 A | 4/1970 | Mouille et al. | |
| 3,765,622 A | 10/1973 | Haines | |
| 3,782,223 A | 1/1974 | Watson | |
| 3,977,632 A | 8/1976 | Watson | |
| 3,977,812 A | 8/1976 | Hudgins | |
| 4,177,693 A | 12/1979 | Ivanko et al. | |
| 4,362,337 A | 12/1982 | Casanova | |
| 4,479,619 A | 10/1984 | Saunders et al. | |
| 4,489,625 A * | 12/1984 | White | 74/665 C |
| 4,609,165 A | 9/1986 | Logan et al. | |
| 4,632,337 A | 12/1986 | Moore | |
| 4,783,023 A | 11/1988 | Jupe | |
| 4,811,627 A * | 3/1989 | Mouille | 74/665 L |

(Continued)

FOREIGN PATENT DOCUMENTS

JP    10264895    10/1998

*Primary Examiner*—Michael R Mansen
*Assistant Examiner*—Joshua J Michener
(74) *Attorney, Agent, or Firm*—Carlson, Gaskey & Olds PC

(57) ABSTRACT

A gearbox of a rotary-wing aircraft includes at least one variable speed system which optimizes the main rotor speed for different flight regimes such as a hover flight profile and a high speed cruise flight profile for any rotary wing aircraft while maintaining an independently variable tail rotor speed.

16 Claims, 3 Drawing Sheets

U.S. PATENT DOCUMENTS

| | | | |
|---|---|---|---|
| 5,135,442 | A | 8/1992 | Bossler, Jr. |
| 5,271,295 | A | 12/1993 | Marnot |
| 5,472,386 | A | 12/1995 | Kish |
| 5,782,433 | A | 7/1998 | Goi et al. |
| 5,797,185 | A | 8/1998 | Sammataro et al. |
| 5,807,202 | A | 9/1998 | Sammataro |
| 6,024,324 | A | 2/2000 | Maino et al. |
| 6,029,930 | A | 2/2000 | Maino et al. |
| 6,042,499 | A | 3/2000 | Goi et al. |
| 6,065,718 | A | 5/2000 | Piasecki |
| 6,077,041 | A | 6/2000 | Carter, Jr. |
| 6,098,921 | A | 8/2000 | Piasecki |
| 6,302,356 | B1 | 10/2001 | Hawkins |
| 6,312,358 | B1 | 11/2001 | Goi et al. |
| 6,364,249 | B1 | 4/2002 | Morgan et al. |
| 6,428,443 | B1 | 8/2002 | Dischler |
| 6,467,726 | B1 | 10/2002 | Hosada |
| 6,554,729 | B2 | 4/2003 | Gleasman et al. |
| 6,612,195 | B2 | 9/2003 | Gmirya et al. |
| 2002/0029647 | A1* | 3/2002 | Brooks ................. 74/424 |
| 2002/0145076 | A1 | 10/2002 | Alford |
| 2004/0211278 | A1 | 10/2004 | Gmirya et al. |
| 2005/0178893 | A1 | 8/2005 | Miller et al. |
| 2006/0192046 | A1 | 8/2006 | Heath et al. |
| 2006/0266883 | A1 | 11/2006 | Gmirya |
| 2006/0269414 | A1 | 11/2006 | Palcic et al. |
| 2006/0276299 | A1 | 12/2006 | Imanishi |

* cited by examiner

VARIABLE SPEED GEARBOX WITH AN INDEPENDENTLY VARIABLE SPEED TAIL ROTOR SYSTEM FOR A ROTARY WING AIRCRAFT

The present invention is a divisional application of U.S. patent application Ser. No. 11/292,556, filed Dec. 2, 2005 now U.S. Pat. No. 7,434,764.

BACKGROUND OF THE INVENTION

The present invention relates to a rotary-wing aircraft, and more particularly to a variable speed rotary wing transmission gearbox system that allows operations at different ratios between the main rotor speed while maintaining an independently variable tail rotor speed.

The forward airspeed of a conventional rotary wing aircraft is limited by a number of factors. Among these is the tendency of the retreating blade to stall at high forward airspeeds. As the forward airspeed increases, the airflow velocity across the retreating blade slows such that the blade may approach a stall condition. In contrast, the airflow velocity across the advancing blade increases with increasing forward speed. Dissymmetry of lift is thereby generated as forward air speed increases.

This dissymmetry of lift may create an unstable condition if not equalized across the advancing and retreating sectors of the rotor disc. Typically, blade flapping and feathering are utilized to substantially equalize the lift. However, as forward airspeed increases beyond a given point for a given rotor rpm, the flapping and feathering action eventually becomes inadequate to maintain substantial equality of lift over the rotor disc. At this point, reverse airflow across the retreating sector creates negative lift and, depending on the forward speed, creates a stalling or negative lift condition that travels outwardly across the blade as airspeed increases.

Conventional main rotor systems must be operated at airspeeds lower than those which cause reverse airflow across a substantial part of the retreating blade and at an rpm low enough to alleviate any potential compressibility Mach number problems at the tip of the advancing blade. This has effectively limited forward airspeeds of conventional helicopters to approximately 180 knots.

Various rotor systems have been proposed which provide variable rotor speed. These systems, however, while changing the speed of the main rotor, also proportionately change the speed of the tail rotor as rotary wing aircraft tail rotors are mechanically linked to the main rotor such that the speeds of each are proportionally related. This prevents conventional rotary wing aircraft from benefiting from decreased rotor speed because the reduced tail rotor speed unacceptably reduces yaw control, so that the desired main rotor speed is not achievable. Similarly, at high forward flight speeds, it is desirable to reduce the tail rotor speed, so that the noise emissions form the rotorcraft are reduced. The tail rotor noise reduction is desirable for operation in populated and congested areas, but is often not possible because flight performance factors prevent a reduction in main rotor speed concurrent with the desirable tail rotor speed reduction.

SUMMARY OF THE INVENTION

A gearbox of a rotary-wing aircraft according to the present invention receives engine power through a gear train such that the power therefrom is distributed to a main rotor system and a tail rotor system. The gearbox includes at least one variable speed system which optimizes the main rotor speed for different flight regimes such as a hover flight profile and a high speed cruise flight profile. Typically during landing, take-off, hover and low speed flight profiles, a lower main rotor speed is desirable for increased lifting capabilities while in a high speed cruise flight profile a higher main rotor speed is desired for improved rotor performance and higher forward airspeed.

The gearbox includes multiple gear reduction stages typically with a total reduction ratio anywhere from 20:1 to 85:1. The high-speed inputs from the engines are connected to the first stage of the gearbox through input shafts. The final stage of the gearbox is connected to the rotor head by a main rotor shaft. The tail rotor is connected through a tail rotor shaft and a tail-take-off (TTO) gear that is in meshing engagement with gears in one of the intermediate main reduction stages.

One gearbox embodiment provides tail-take-off power extracted from the engine before a first gear reduction stage. Synchronized variable speed systems are located within each gear train just after the tail-take-off gear mesh and before the first gear reduction stage mesh. This provides for variation of the main rotor speed while maintaining a constant tail rotor speed.

Another gearbox embodiment locates a variable speed system downstream of the last gear reduction stage and just upstream of the main rotor shaft. This again allows for the variation of main rotor speed while maintaining a constant tail rotor speed with only a single variable speed system which eliminates the synchronization requirement of the above embodiment.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
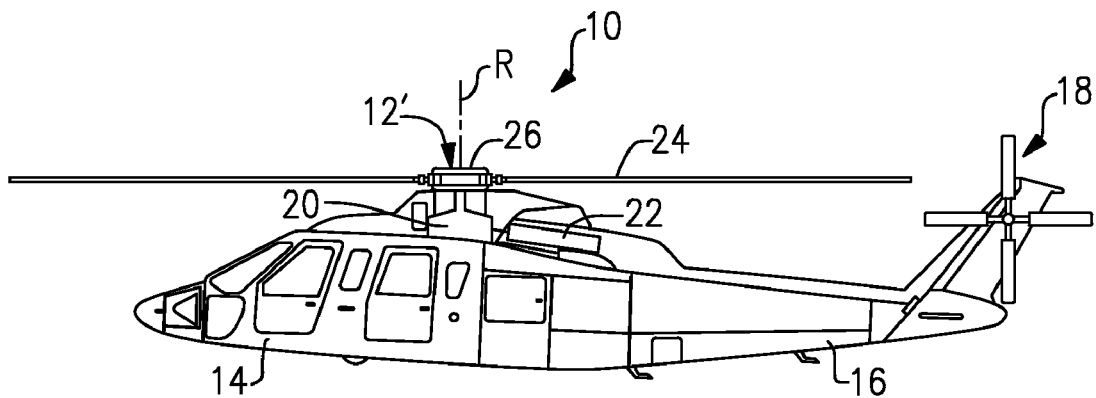
FIG. 1 is a general schematic view of an exemplary rotary wing aircraft embodiment for use with the gearbox system designed according to the present invention.

FIG. 1 schematically illustrates a rotary-wing aircraft 10 having a main rotor system 12. The aircraft 10 includes an airframe 14 having an extending tail 16 which mounts a tail rotor system 18, such as an anti-torque system, a translational thrust system (FIG. 3), a pusher propeller, a rotor propulsion system, and such like. The main rotor assembly 12 is driven about an axis of rotation R through a main gearbox (illustrated schematically at 20) by one or more engines 22. The main rotor system 12 includes a multiple of rotor blades 24 mounted to a rotor hub 26. Although a particular helicopter configuration is illustrated and described in the disclosed embodiment, other configurations and/or machines, such as high speed compound rotary wing aircraft with supplemental translational thrust systems, dual contra-rotating, coaxial rotor system aircraft, turbo-props, tilt-rotors and tilt-wing aircraft, will also benefit from the present invention.

The main gearbox 20 is preferably interposed between the one or more gas turbine engines 22, the main rotor system 12 and the tail rotor system 18. The main gearbox 20 is preferably a split torque gearbox which carries torque from the engines 22 through a multitude of drive train paths. The multiple of paths provides a gearbox which is of significantly less weight than conventional planetary gearboxes while providing redundant transmission paths should one path be rendered inoperable.

Figure 2:
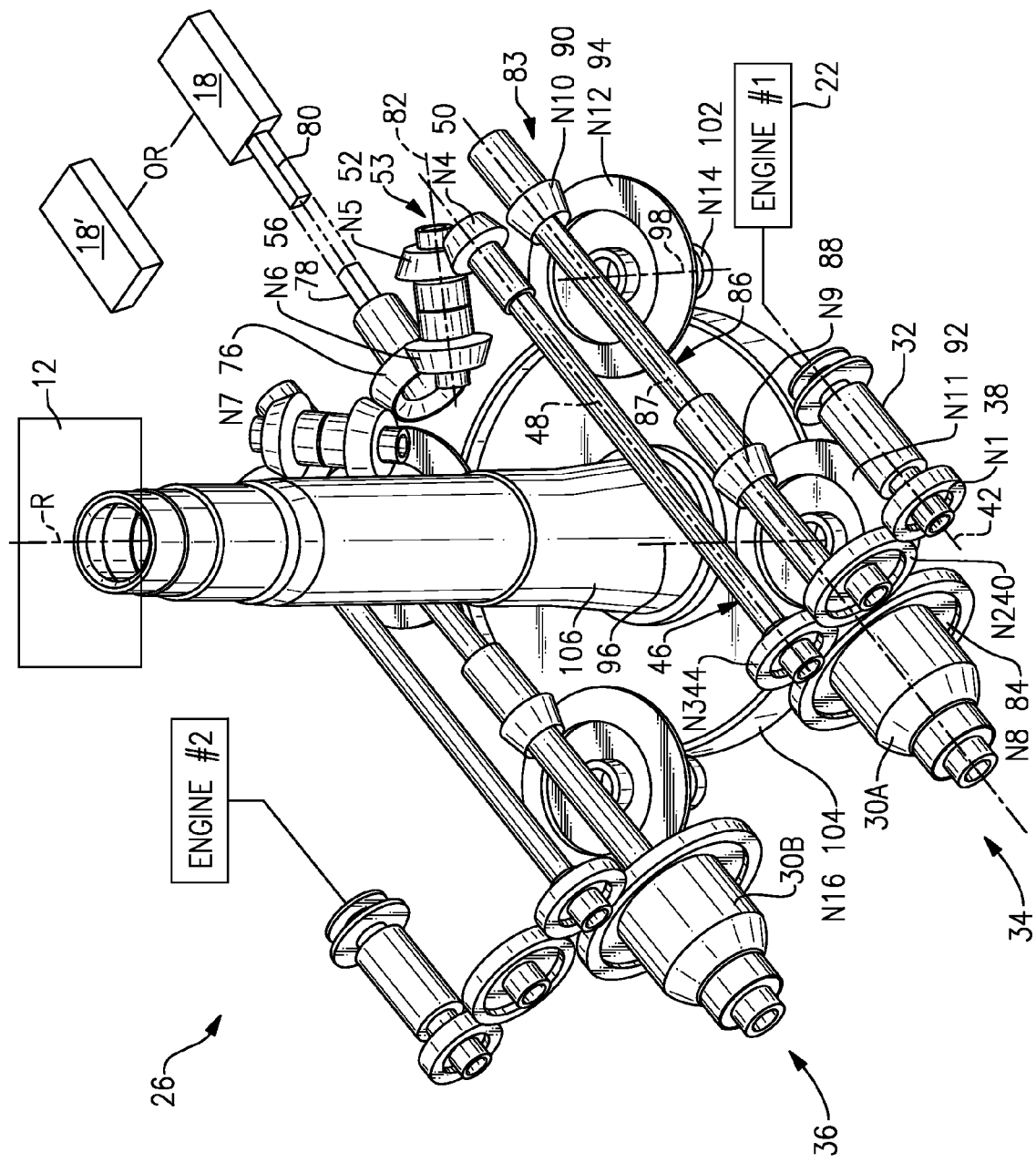
FIG. 2 is a perspective schematic view of a gearbox according to the present invention.

Referring to FIG. 2, the main gearbox 20 is mechanically connected to the main rotor system 12 and to the tail rotor system 18 so that the main rotor system 12 and the tail rotor system 18 are both driven by the main gearbox 20 but the main rotor system 12 may be driven at variable speeds relative the tail rotor system 18.

The main gearbox 20 receives engine power through a high speed input shaft 32 of a gear train 34 driven by the engine 22. Although only the gear train 34 from engine #1 will be discussed in detail herein, the gear train 36 from engine #2 is identical and it should be understood that any number of engines 22 and associated gear trains may be utilized with the present invention.

Each engine 22 drives a gear train path such that the power therefrom is distributed to the main rotor system 12 and the tail rotor system 18. Each gear train 34, 36 respectively includes at least one variable speed system 30A, 30B which are synchronized with each variable speed system 30A, 30B in each other gear train 36, 34.

The variable speed system 30 optimizes main rotor speed for different regimes of flight. The aerodynamics of high-speed rotary wing aircraft show a noticeable benefit by increasing rotor RPM in high speed cruise flight. A slower rotor speed is beneficial for thrust efficiency during hover and take-offs so that more payload can be carried with the same power, while a higher rotor speed during level flight improves forward flight speed and range performance, especially at high gross weights and altitudes. A still lower rotor speed is desirable during landings for noise reduction in certain zones. The benefits can be upwards of 5 to 10% of the lift of the rotor, and 10 to 20% of the payload of the aircraft. The drive arrangement permits the speed of the rotor system 12 to be controlled so, for example, the above-described advantages are readily achieved.

The high-speed input shaft 32 includes a gear N1 38 which drives a corresponding gear N2 40. It should be understood, that although particular gear types are discussed in the illustrated embodiment and the preferred form may be specified, gear forms other than the specific gear forms may also be utilized with the present invention. The input shaft 32 rotates about an input shaft axis of rotation 42 located generally transverse to the rotor axis of rotation R.

The gear N2 40 is an idler gear which drives a gear N3 44 which provides a gear reduction between gear N1 38 and gear N3 44. Gear N3 44 drives a tail-take-off shaft 46 which rotates about a tail-take-off shaft axis of rotation 48 generally parallel to the input shaft axis of rotation 42. The tail-take-off shaft 46 drives a spiral bevel gear N4 50 mounted thereto. The spiral bevel gear N4 50 meshingly engages a spiral bevel gear N5 52 mounted to a tail rotor input shaft 53. The tail rotor input shaft 53 includes a spiral bevel gear N6 56 which meshingly engages a main tail-take-off (TTO) gear N7 76. The TTO gear N7 76 drives a tail rotor transmission shaft 78 about a tail rotor transmission shaft axis of rotation 80 to drive the tail rotor system 18. The tail rotor input shaft 53 is driven about a tail rotor input axis of rotation 82 which may be transverse to the tail-take-off shaft axis of rotation 48, the transmission shaft axis of rotation 80, and the main rotor axis of rotation R. Notably, the tail rotor input shaft 52 from each gear train 34, 36 engages the main TTO gear N7 76 to provide redundant drive thereof.

The tail-take-off power is extracted from the engine before the first reduction stage 83 and upstream of the variable speed system 30A which provides for variation of the main rotor system 12 speed with the variable speed transmission 30A while maintaining a constant tail rotor system 18 speed.

Each of the variable speed systems 30A, 30B may include a hydraulic system, a planetary gearbox, a multi-plate clutch, a braking system, or such like which permits at least two different rotor speeds for the main rotor system 12 without disengaging the engines 22 or changing engine RPM. The variable speed systems 30A, 30B facilitate different flight profiles, such as a low speed flight profile and a high speed flight profile for any rotary wing aircraft. Typically during landing, take-off, hover and low speed flight profiles, a lower main rotor speed is required for increased lifting capabilities while in a high speed cruise flight profile, a higher main rotor speed is desired for improved rotor performance and increased airspeed. During any of the these flight profiles, the speed of the tail rotor transmission shaft 78 and the tail rotor system 18 are related to engine speed rather than the main rotor system 12 to assure adequate yaw control. It should be understood that the gear reduction from gear N1 38 to gear N3 44 is determined to provide adequate yaw control under desired engine operating speeds.

Gear N3 44 is also in meshing engagement with gear N8 84 of the first reduction stage 83. Gear N8 84 preferably mounts the variable speed system 30A such that the reduction stage 83 speed is controlled thereby. That is, the reduction stage 83 operates at variable speed as set by the variable speed system 30A. Gear N8 84 drives a reduction stage shaft 86 about a reduction stage shaft axis of rotation 87. The reduction stage shaft axis of rotation 87 is generally parallel to the input shaft axis of rotation 42 and transmission shaft axis of rotation The reduction stage shaft 86 includes a first spiral bevel gear N9 88 and a second spiral bevel gear N10 90. Each spiral bevel gear N9 88, N10 90 is in meshing engagement with a respective spiral bevel gear N11 92, N12 94 in a facial mesh arrangement which transfers torque from the reduction stage shaft axis of rotation 87 to respective axes of rotation 96, 98 which are generally transverse thereto. Each spiral bevel gear N11 92, N12 94 drives a respective spur gear N13 100, N14 102 about their respective axis of rotation 96, 98 which are generally parallel to the main rotor axis of rotation R.

The spur gears N13 100 (shown in gear train 36), N14 102 meshingly engage a main gear N16 104 mounted to a main rotor shaft 106. The main rotor shaft 106 rotates the main rotor system 12 about the axis of rotation R.

The main gearbox 20 may also be configured for a high speed compound rotary wing aircraft 10' having a translational thrust system 18' (FIG. 3) in which the translational thrust system 18' is driven by the tail rotor transmission shaft 78' to provide the primary forward thrust during a high speed flight profile. Of course, the gearbox 20 must be adapted to drive a dual, contra-rotating, coaxial rotor system 12', but this is readily achieved by, for example, associating one of the respective spur gears N13 100, N14 102 with separate counter-rotating main gears which counter rotate associated main rotor shafts. For further understanding of a main gearbox and associated components thereof, which may be used in connection with the present invention, attention is directed to U.S. patent application Ser. No. 11/140,762 entitled SPLIT TORQUE GEARBOX FOR ROTARY WING AIRCRAFT WITH TRANSLATIONAL THRUST SYSTEM which is assigned to the assignee of the instant invention and which is hereby incorporated by reference in its entirety.

Figure 3:
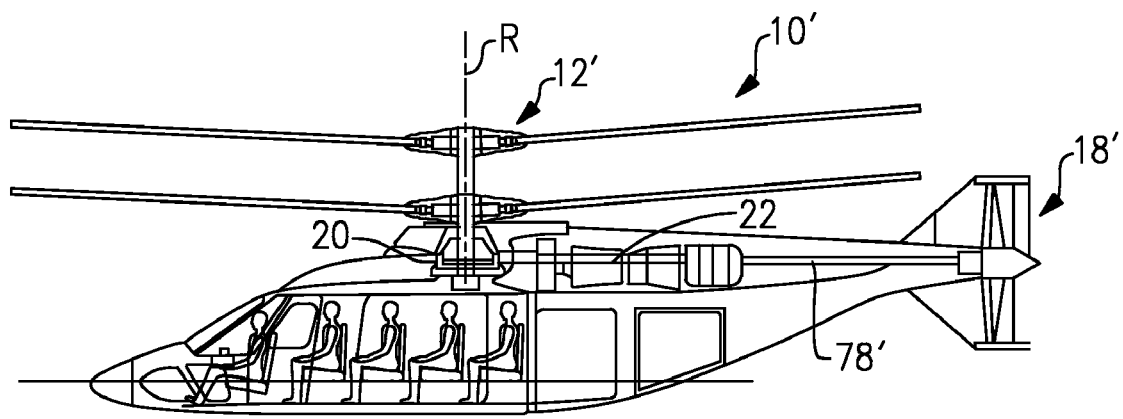
FIG. 3 is general schematic view of an exemplary high speed compound rotary wing aircraft embodiment for use with a gearbox system designed according to present invention.

The main gearbox 20 may alternatively be utilized with a helicopter where the tail rotor changes orientation to provide anti-torque forces to counteract the main rotor torque in hover and then transition to a pusher propeller orientation such as illustrated in FIG. 3 to then provide translational thrust during a high speed flight profile.

Figure 4:
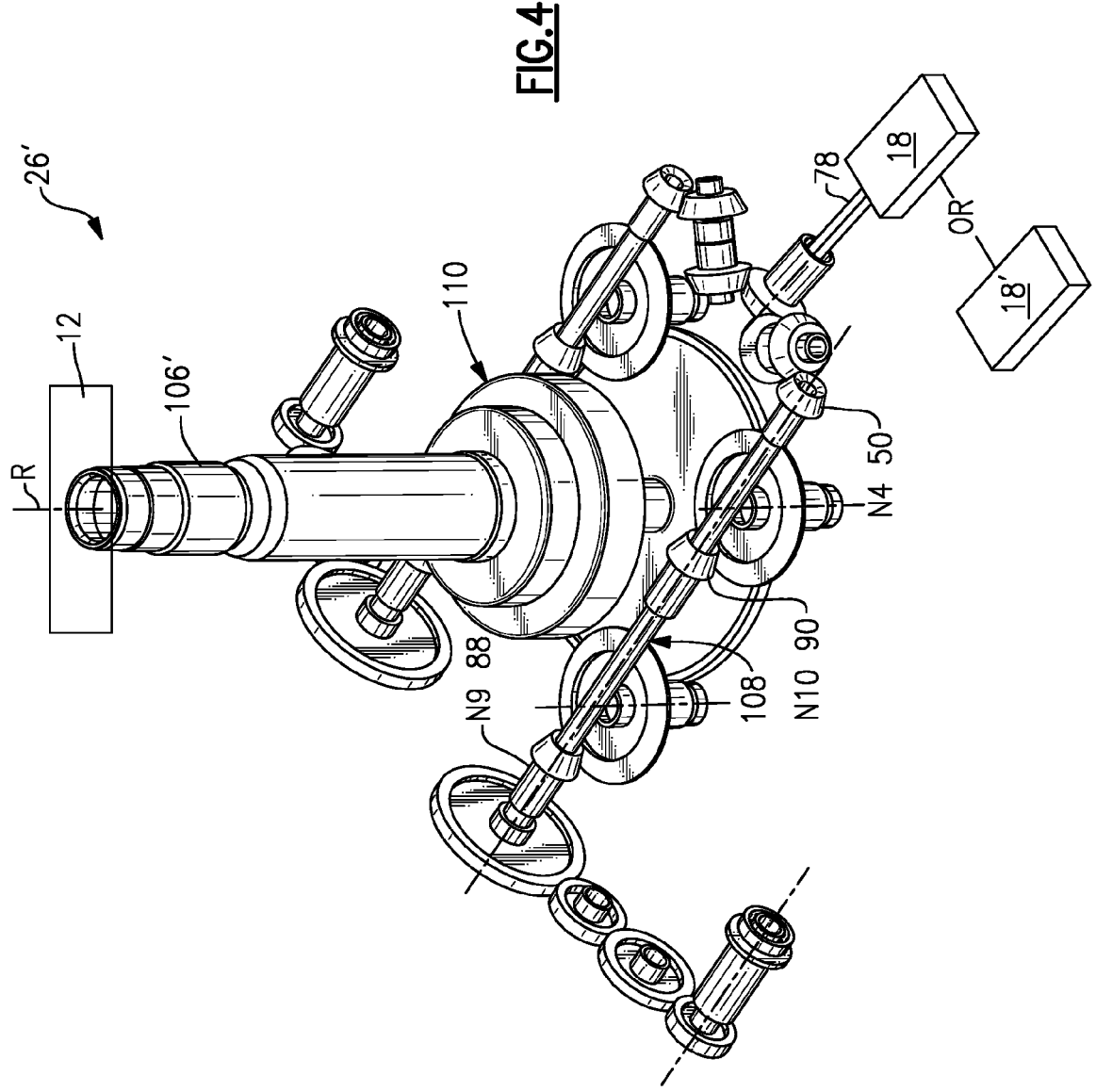
FIG. 4 is a perspective schematic view of another gearbox according to the present invention.

Referring to FIG. 4, another main gearbox 20' for a high speed rotary wing aircraft 10 is schematically illustrated. The main gearbox 20' includes a tail-take-off shaft 108 with the spiral bevel gear N4 50 which drives the tail rotor system 18, as well as supports the first spiral bevel gear N9 88 and the second spiral bevel gear N10 90. The tail-take-off and the first stage reduction are thereby combined into a single shaft as compared to the separate shafts as disclosed in the FIG. 2 embodiment.

The variable speed system 110, however, is located after the last reduction stage of the gearbox, just before the main rotor shaft 106'. This again allows for the variation of main rotor system 12 speed while relating the tail rotor transmission shaft 78 and the driven tail rotor system 18 or translational thrust system 18' to engine speed rather than the main rotor system 12. The FIG. 4 embodiment advantageously utilizes only a singe variable speed system 110 which minimizes complexity and eliminates the need for synchronization.

It should be understood that relative positional terms such as "forward," "aft," "upper," "lower," "above," "below," and the like are with reference to the normal operational attitude of the vehicle and should not be considered otherwise limiting.

It should be understood that although a particular component arrangement is disclosed in the illustrated embodiment, other arrangements will benefit from the instant invention.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A main gearbox system for a rotary-wing aircraft which drives a main rotor system and a tail rotor system comprising:
    a main gear coaxial with a main rotor shaft of the main rotor system;
    an input shaft driven at an engine speed;
    a tail-take-off shaft driven by said input shaft, said tail-take-off shaft driven about a tail-take-off shaft axis of rotation to drive said main gear, said tail-take-off shaft axis of rotation extends across at least a portion of said main gear;
    a variable speed system downstream of said main gear, said variable speed system selectively operable to drive said main rotor system at a variable speed relative to the engine speed; and
    a tail rotor system driven through said tail-take-off shaft, said tail rotor system driven at a constant speed relative to the engine speed.

2. The main gearbox system as recited in claim 1, wherein said variable speed system is coaxial with said main rotor shaft.

3. The main gearbox system as recited in claim 1, further comprises at least one spiral bevel gear mounted along said tail-take-off shaft to drive a reduction stage gear train.

4. The main gearbox system as recited in claim 3, wherein said reduction stage gear train drives said main gear.

5. The main gearbox system as recited in claim 1, wherein said tail-take-off shaft a tail rotor transmission shaft about a tail rotor transmission shaft axis of rotation, said tail rotor transmission shaft operable to drive said tail rotor system.

6. The main gearbox system as recited in claim 5, wherein said tail-take-off shaft is in meshing engagement with a tail rotor input shaft driven about a tail rotor input axis of rotation, said tail rotor input axis of rotation transverse to said tail-take-off shaft axis of rotation and said tail rotor transmission shaft axis of rotation.

7. The main gearbox system as recited in claim 6, further comprises at least one spiral bevel gear mounted along said tail-take-off shaft, said at least one spiral bevel gear operable to drive said tail rotor input shaft.

8. The main gearbox system as recited in claim 1, wherein said tail rotor system comprises an anti-torque rotor.

9. The main gearbox system as recited in claim 1, wherein said tail rotor system comprises a translational thrust system.

10. The main gearbox system as recited in claim 1, wherein said input shaft and said tail-take-off shaft are generally parallel.

11. The main gearbox system as recited in claim 1, wherein said variable speed system is between said main gear and said main rotor system.

12. The main gearbox system as recited in claim 2, wherein said variable speed system is between said main gear and said main rotor system.

13. A main gearbox system for a rotary-wing aircraft which drives a main rotor system and a tail rotor system comprising:
    a main gear coaxial with a main rotor shaft of the main rotor system;
    an input shaft driven at an engine speed;
    a variable speed system downstream of said main gear, said variable speed system selectively operable to drive said main rotor system at a variable speed relative to the engine speed; and
    a tail rotor system upstream of said variable speed system, said tail rotor system driven at a constant speed relative to the engine speed.

14. The main gearbox system as recited in claim 13, wherein said variable speed system is coaxial with said main rotor shaft.

15. The main gearbox system as recited in claim 14, wherein said variable speed system is between said main gear and said main rotor system.

16. The main gearbox system as recited in claim 13, wherein said variable speed system is between said main gear and said main rotor system.

* * * * *